US008865613B2

(12) United States Patent
Mordkovich et al.

(10) Patent No.: US 8,865,613 B2
(45) Date of Patent: Oct. 21, 2014

(54) CATALYST FOR SYNTHESIS OF HYDROCARBONS FROM CO AND $H_2$ AND PREPARATION METHOD THEREOF

(75) Inventors: Vladimir Zalmanovich Mordkovich, Moscow (RU); Aida Razimovna Karaeva, Moscow (RU); Lilia Vadimovna Sineva, Moscow (RU); Eduard Borisovich Mitberg, Ekaterinburg (RU); Igor Grigorievich Solomonik, Moscow (RU); Vadim Sergeevich Ermolaev, Moscow (RU)

(73) Assignee: Infra XTL Technology Limited, Limassol (CY)

( * ) Notice: Subject to any disclaimer, the term of this patent is extended or adjusted under 35 U.S.C. 154(b) by 81 days.

(21) Appl. No.: 13/504,929

(22) PCT Filed: Oct. 22, 2010

(86) PCT No.: PCT/RU2010/000618
§ 371 (c)(1),
(2), (4) Date: Apr. 27, 2012

(87) PCT Pub. No.: WO2011/053192
PCT Pub. Date: May 5, 2011

(65) Prior Publication Data
US 2012/0214664 A1   Aug. 23, 2012

(30) Foreign Application Priority Data
Oct. 29, 2009   (RU) ................................. 2009139846

(51) Int. Cl.
*B01J 27/25*   (2006.01)

(52) U.S. Cl.
USPC ............ 502/185; 502/325; 502/326; 502/180

(58) Field of Classification Search
USPC .................. 502/325–326, 180, 185
See application file for complete search history.

(56) References Cited

U.S. PATENT DOCUMENTS

| | | | |
|---|---|---|---|
| 4,895,994 | A | 1/1990 | Cheng et al. |
| 5,935,897 | A | 8/1999 | Trubenbach et al. |
| 6,156,694 | A | 12/2000 | Harper |
| 6,624,204 | B1 | 9/2003 | Daage et al. |
| 2001/0047041 | A1 | 11/2001 | Lapidus et al. |
| 2003/0052006 | A1 * | 3/2003 | Noca et al. ............ 204/450 |
| 2004/0132832 | A1 | 7/2004 | Espinoza et al. |
| 2005/0103990 | A1 * | 5/2005 | Pham-Huu et al. ........ 250/281 |
| 2006/0165986 | A1 | 7/2006 | Potapova et al. |

FOREIGN PATENT DOCUMENTS

| | | |
|---|---|---|
| RU | 2256501 C1 | 7/2005 |
| RU | 2326732 C1 | 6/2008 |
| WO | WO 99/25652 A1 | 5/1999 |
| WO | WO 9925652 A1 * | 5/1999 |
| WO | WO 2005/065100 A2 | 7/2005 |
| WO | WO 2005065100 A2 * | 7/2005 |
| WO | WO 2008/079051 A1 | 7/2008 |
| WO | WO 2008079052 A1 * | 7/2008 |
| WO | WO 2011/016759 A1 | 2/2011 |

OTHER PUBLICATIONS

Zaman et al. "Fischer-Tropsch synthesis over cobalt dispersed on carbon nanotube-based supports and activated carbon". Fuel Processing Technology 90. 1214-1219.*
He, N. et al. "Effect of Structure and Pore Size of Mesoporous Molecular Sieve Materials on the Growth of Carbon Nanotubes" Journal of inclusion Phenomena and Macrocylic Hemistry. 35 211-224.*
Jeong, S. et al. "Packing Density Control of Aligned Carbon Nanotubes". Chem. Mater., 2002, 14 (10), pp. 4003-4005.*
Tavasoli, A. H. M. A. D., et al. "Cobalt supported on carbon nanotubes—A promising novel Fischer-Tropsch synthesis catalyst." Fuel Processing Technology 89.5 (2008): 491-498.*
Machine English translation of WO2008079052.*
He, N. et al. 1999 "Effect of Structure and Pore Size of Mesoporous Molecular Sieve Materials on the Growth of Carbon Nanotubes" *Journal of Inclusion Phenomena and Macrocyclic Chemistry* 35: 211-224.
Zaman, M. et al. 2009 "Fischer—Tropschsynthesisovercobaltdispersed on carbon nanotubes-based supports and activated carbon" *Fuel Processing Technology* 90: 1214-1219.
Orchard, et al. 1983 "Preparation and Properties of Raney Nickel-Cobalt Catalysts" *Journal of Catalysis* 84: 189-199.
Sineva, et al. 2013 "Fischer-Tropsch synthesis in the presence of composite catalysts with different types of active cobalt" *Mendeleev Communications* 23: 44-45.

* cited by examiner

*Primary Examiner* — Richard M Rump
(74) *Attorney, Agent, or Firm* — Knobbe, Martens Olson & Bear, LLP

(57) ABSTRACT

The disclosed technology relates to nanotechnology, petrochemistry, gas chemistry, coal chemistry, in particular to a catalyst based on carbon nanotubes for synthesis of hydrocarbons from CO and $H_2$ and a preparation method thereof. The carbon nanotubes fixed in the catalyst pellet pores improve mass and heat transfer in the catalyst pellet and the catalyst bed.

10 Claims, No Drawings

CATALYST FOR SYNTHESIS OF HYDROCARBONS FROM CO AND H$_2$ AND PREPARATION METHOD THEREOF

FIELD OF THE INVENTION

The present invention is about nanotechnology, petrochemistry, gas chemistry, coal chemistry and it relates to a catalyst composition for exothermic processes, particularly for synthesis of C$_5$ and higher hydrocarbons from CO and H$_2$ under the Fischer-Tropsch reaction and a preparation method thereof.

BACKGROUND OF THE INVENTION

The production of hydrocarbons from carbon monoxide and hydrogen (the Fischer-Tropsch process) is carried out in the presence of catalysts based on metals selected from the Group VIII of the Mendeleev's Periodic Table of the Elements. The catalyst composition plays a key role in the production of hydrocarbons because it gives a final result, i.e. product composition.

It is well-known that the production of hydrocarbons from CO И H$_2$ is exothermic and is carried out at high pressures. There is a need in improvement of the catalyst composition to maintain high activity and selectivity of catalysts. Such improvement will give an option cutting the likelihood of local overheating which has an adverse effect on catalyst selectivity for production of the main products and causes the catalyst deterioration.

The main requirements for the catalytic bed formation in the Fischer-Tropsch process (e.g. high concentration of catalytically active component in the reaction volume, small size of the catalyst particles (less than 50 μm); high heat conductivity of the catalyst bed; the extended surface of the gas-liquid interphase; providing regimen of the gas convection current close to plug flow) are not fulfilled in the current process flow diagrams where the usual catalysts in slurry, fixed or fluidized bed are used (Hasin A. A. et al., Catalysis in industry, No 2, 2002, p. 26-37). Therefore the effective production of hydrocarbons from synthesis gas requires development of the new type catalysts.

The above- described problem takes place in the process on a solid catalyst (pelletized, ring-shaped and the like) which forms the fixed bed and is placed inside the tube divided the gas space with the catalyst and the liquid phase (water) for heat removal. One of the methods for overcoming the process problem is increasing of the heat conductivity of the solid catalyst. It is possible to increase the heat conductivity of the solid catalyst by using of metals, carbides and nanocarbon material as catalyst components (S. Berber et al., Unusually High Thermal Conductivity of Carbon Nanotubes, *Physical review letters*, Vol. 84, N. 20, 2000, p. 4613-4616).

WO2004069407 discloses a preparation method of a catalyst for production hydrocarbons and/or oxygen-containing compounds from synthesis gas. The catalyst is prepared from powders of a catalytically active agent, a heat-conducting agent and a pore-forming agent with particle size less than 300 μm. Firstly the powders of the heat-conducting and pore-forming agents are mixed, then the powder of the catalytically active agent is added to the mixture, the mixture is compressed, the catalyst body is putted into the required shape and the heat treatment of the catalyst body takes place. The compressing and shaping the catalyst body into cylinder or perforated cylinder or plate or profiled plate is carried out by pelletizing in a rolling mill; the blanking of the plate of the required form is added. The heat treatment is two-stage, firstly in the inert gas current at temperature above 400° C. and then in the hydrogen-containing gas current at temperature above 300° C. The catalytically active agent comprises a metal selected from the Group VIII of the Mendeleev's Periodic Table of the Elements in amount of at least 2 wt %. The metallic copper and/or zinc and/or aluminium and/or tin and/or mixtures or alloys thereof are used as the heat-conducting agent. An oxide and/or hydroxide and/or carbonate and/or hydroxocarbonate and/or a salt of the metal from the heat-conducting agent or the powder of the catalytically active agent are used as the pore-forming agent. The weight content of the pore-forming agent to the weight content of the heat-conducting agent ratio is 0.25-4. The disadvantage of the catalyst is a disalignment of the catalyst body position and the direction of the reaction stream. Therefore in spite of the heat-conducting agent presence such catalyst has low efficiency (CO conversion does not exceed 15% at syngas hour space rate 930 l/h).

EP0681868 relates to a catalyst for the Fischer-Tropsch process. There is cobalt or iron loaded on a support in the catalyst. The support is carbon with the specific surface area at least 100 m$^2$/g. The catalyst comprises a promoter—platinum (0.2-10% ). The catalyst is prepared by impregnation of a carbon powder (0.5-1.0 mm) with an aqueous solution of metal salts. Previously carbon from the organic material (such as coconut coal, peat, coal, carbonized polymers) is treated subsequently at a temperature of 300-3300° C. in an inert, oxidizing and again in inert atmosphere. The production is carried out at a temperature 150-300° C., pressure 0.1-5 MPa and H$_2$:CO ratio of 1:1-3:1. The drawback of the catalyst is low selectivity of C$_5$ and higher products due to the quite low heat conductivity of the support.

SU1819158 provides a catalyst for production of hydrocarbons from synthesis gas. The catalyst comprises iron as active component, copper, silicon, potassium and coal (2-20 g on 100 g of iron) activated with steam or mineral acid. The catalyst is obtained by individual dissolving iron and copper in nitric acid at elevated temperature, then they are mixed and the obtained solution is brought to the boil, alkali liquor or calcined soda solution is added to the boiled suspension to adjust pH to 7-8. The suspension is filtered, the solids are suspended in a steam condensate and potassium containing waterglass is added, followed by nitric acid treatment, the catalyst precipitate separation, drying and formation by extrusion, additional drying and desintegration. The Fischer-Tropsch synthesis is carried out in a reactor with a fixed bed of the catalyst under a pressure 20-30 bar and a temperature 220-320° C. The yield of the solid product in the form of wax is 40-55% on hydrocarbons C$_{2+}$ basis. The drawbacks of the catalyst are low productivity and selectivity for the main products, as well as a quite difficult preparation method.

The catalysts comprising a carbon nanofiber or carbon nanotubes (CNT, SWNT, MWNT) are well-known.

Carbon nanofiber is a material consisting of thin threads, formed mainly by carbon atoms, each thread less than 1 μm in diameter. Carbon atoms are united into microcrystals, aligned in parallel each other. Carbon fibers are characterized by high tensile strength and chemical resistance, low specific density and coefficient of thermal expansion. Some carbon fibers have higher heat-conductivity along the fiber axis. Carbon nanotube (SWNT, MWNT) is one of the forms of the carbon nanofiber and has maximum heat conductivity. The microstructure of carbon nanotubes differs from the structure of other carbon nanofibers by extended cylindrical structures. These structures have a diameter from one to several dozens nm and they are usually up to few μm in length.

An ideal nanotube is a graphite layer rolled up into a hollow cylinder; the graphite layer is composed of hexagons and every vertex of such hexagon is the carbon atom. However the structure of the experimental single-wall carbon nanotubes is not ideal in many ways. Multiwall nanotubes differ from the single-wall nanotubes by a wide range of shapes and configurations. There are different structures both in the longitudinal and transverse directions. Multi-wall carbon nanotube structure formation depends on synthesis conditions in the specific experiment. An analysis of experimental data demonstrated that the most typical structure of the multi-wall carbon nanotube is a structure like a Russian doll in which tubes of smaller diameter are coaxially arranged within tubes of bigger diameter.

Carbon nanotubes were first synthesized by evaporation of graphite in the arc discharge. In accordance with the present invention carbon nanotubes are formed by chemical vapor deposition (CVD). During CVD, a substrate is prepared with a layer of metal catalyst particles (most commonly nickel, cobalt, iron, or a combination thereof). The substrate is heated to approximately 600-1200° C. To initiate the growth of nanotubes, a carbon-containing gas (such as acetylene, ethylene, ethanol or methane etc.) is bled into the reactor. Nanotubes begin to grow at the sites of the metal catalyst.

Therefore it will be attractive to use carbon nanofiber and nanotubes in the catalyst composition; it makes possible to increase the heat conductivity of the catalyst and have a good influence on the catalyst efficiency.

However the catalysts comprising carbon nanofibers or nanotubes have disadvantages. Particularly carbon nanofibers and nanotubes are corrodible because of hydrogenation. Should the arrangement of carbon nanofibers and nanotubes in the catalyst provides contact of the nanomaterial mainly with hydrogen-containing gas rather than main products, the disadvantage may come out. Although carbon nanofibers and nanotubes have high heat conductivity, they are not able to transfer full heat flow to the surrounding particles by reason of low contact heat conductivity (in the event of free arrangement). It leads to the second disadvantage. Moreover active components of the catalyst have low activity, if the major part of the surface (for loading of the active components) is carbon that is not mixed and impregnated with other components, e.g. oxide components.

For example, CN101185904 relates to a catalyst which is applicable for the selective catalytic hydrogenation of carbonyl compounds to aromatic alcohols and preparation method thereof. The catalyst comprises 1) structured substrate, such as metal foam, honeycomb ceramic, carbon felt and ceramic fiber; 2) nanomaterial coating, such as carbon nanofiber; 3) metal active component, such as nickel, ruthenium, rhodium, palladium and/or platinum.

The main drawback of the catalyst is low activity because the active centers of the catalyst are loaded directly into nanocarbon arranged in the catalyst in such way that the nanomaterial contacts mainly with hydrogen-containing gas. Also a loss of the catalyst in the hydrogenation process of the nanocarbon coating is significant.

EP1782885 discloses a carbon nanotubes supported cobalt catalyst for converting synthesis gas into hydrocarbons. The catalyst is prepared by incorporating cobalt and/or ruthenium and optionally an alkali metal onto a CNT support. The catalyst is suited for the conversion of synthesis gas into a mixture of essentially linear and saturated hydrocarbons. The cobalt content, expressed by weight % of cobalt based on the total weight of the catalyst, is between 1 and 60%, the ruthenium content, expressed by weight % of ruthenium based on the amount of cobalt present in the catalyst, is between 0.1 to 1% and the alkali metal content, expressed weight % of alkali metal based on the amount cobalt present in the catalyst, is between 0 to 3% by weight.

The main drawback of the catalyst is an absence of the possibility to use the catalyst in industrial conditions. High yield of the product may be achieved only at low syngas load because the heat released during the process may be removed from the active centers and nanotubes together with the products. The purpose of using CNT in the catalyst is limited by obtaining of the dispersed cobalt clusters.

RU2325226 provides a catalyst for synthesis of hydrocarbons from CO and $H_2$ comprising a metal of the VIII group of the Mendeleev's Periodic Table of the Elements and a support, comprising an oxide component and carbon nanofiber. The active component content is 5-40% by weight based on the total weight of the catalyst and the oxide component contains aluminium oxide and/or silicon oxide and/or titanium oxide and/or zirconium oxide. Additionally the catalyst can include promoters (zirconium and a metal of the VII, VIII groups of the Mendeleev's Periodic Table of the Elements and/or oxides in an amount of 0.1-5% by weight based on the total weight of the catalyst). As well as the catalyst contains carbon nanofiber in form of cylinders of about 3 mm in length and at least 20 μm in diameter in an amount of 1-25% by weight based on the total weight of the catalyst. The method of making the catalyst comprises preparation of the paste which consists of oxide component, carbon nanofiber, boehmite as binder, water, a plasticizer, and a pore-forming component; followed by extrusion, drying, calcinating, and then the consecutive stages of the impregnation with a solution of metal salts are carried out until the content 5-40 wt % of cobalt and 0.1-5% of promoters have been achieved. After each stage of the impregnation the drying and calcinating are performed.

Before carrying out the synthesis, a sample of the catalyst is activated by reduction in the stream of hydrogen (gas hour space rate 100-5000 l/h) at a temperature in the range from 300 to 600° C. during a time period from 0.5 to 5 hours. Synthesis of hydrocarbons from $CO:H_2$ is carried out in a tubular reactor with a fixed bed of the catalyst under a pressure in the range from 0.1 to 4 MPa and a temperature in the range from 150 to 300° C.

However the active component is applied to the support by impregnation, the support comprises the oxide component and metallic aluminium as heat-conducting component. Such procedure results in overconsumption of the expensive active metal to provide the claimed activity and selectivity of the catalyst.

Chin et al. report (Chin Y. H. et.al., Preparation of a novel structured catalyst based on aligned carbon nanotube arrays for a microchannel Fischer-Tropsch synthesis reactor, *Catalysis Today*, v. 110, pp. 47-52, 2005) a microstructured flat catalyst based on aligned multiwall carbon nanotube arrays for Fischer-Tropsch synthesis in a microchannel reactor. The carbon nanotube arrays are disposed on the surface of metalloceramic alloy foam. Also Chin et al. report the preparation of such catalyst comprising few difficult and time-consuming stages. Preparation method of the structured catalyst with the carbon nanotubes on the surface of the metalloceramic alloy foam involves the following stages:

1) the FeCrAlY intermetallic alloy foam is prepared;
2) the FeCrAlY intermetallic foam is oxidized in air; and then coated with a layer of aluminium oxide by the metal organic chemical vapor deposition (MOCVD) of aluminum isopropoxide at 900° C.;
3) the Fe/mesoporous silica sol is prepared and coated onto the foam;

4) the obtained material is dried and calcinated;

5) the carbon nanotube growth is carried out by catalytic decomposition of ethylene at 700° C.

6) the material with carbon nanotubes is subsequently dip coated with a colloid alumina alcoholic solution, then an aqueous solution containing cobalt nitrate and pherrennic acid to apply Co—Re/Al$_2$O$_3$ onto the material;

7) after each dip drying and calcining at 350° C. for 3 h in air is repeated;

8) the catalyst is activated (or reduced);

9) the catalyst is tested in a microchannel steel reactor.

The carbon nanotubes are fixed on the metalloceramic substrate that provides the efficient heat transfer from the active centers (disposed on the free ends of the nanotubes). However the direction of the heat removal does not correlate anyway with the directions of the reagent and product flows. This fact inevitably negates the efficiency of the heat removal in the reactor. The carbon nanotubes stay out of the mass transfer because the reagents and products are flowed from the free ends of the nanotubes to the outside. It is impossible to use such catalyst in the usual catalytic reactor; this view is substantiated by the author's recommendation to use the catalyst in the microchannel reactor. The stated disadvantages are compensated for the performance features in the microchannel system.

The catalyst has other drawbacks. The catalyst has the sophisticated structural design. The preparation method is quite complicated; it results in quite low technical parameters of the catalyst, namely CO conversion of 42% and CH$_4$ selectivity of 27%. Also that multistage and labor-intensive preparation method makes impossible use of the catalyst in industry.

Therefore the catalysts and the preparation methods described above have the following principal drawbacks: high cost due to high content of the expensive components; low heat conductivity of pellets; complexity of preparation and need of high temperature processing, which require special equipment, increase the catalyst cost and overcomplicates the preparation method.

Numerous studies of the inventors demonstrate that using nanotubes and nanofibers would be efficient if their arrangement in the catalyst gives possibility to enhance the heat flow from the active centers of the catalyst in the direction of the reagent and product flows. Mass transfer intensification would be possible in result of high affinity of the produced hydrocarbons and the graphite-like surface of the carbon nanotubes. The carbon nanotubes have to meet the following criteria to achieve the required effect: firstly almost an ideal cylindrical structure but with enough defects for the intermediate sorption/desorption of hydrocarbons; secondly a length comparable with a path length of a molecule of the product from the active center to the catalyst pellet surface; thirdly, an arrangement along the withdrawal path of the product from the active centers to the catalyst pellet surface, preferably along the walls of the transport pores.

Summarizing the aforesaid it should to be noted that a need exists for an effective, selective catalyst of new type, such catalyst should be stable to overheating, reliable, with improved heat- and mass-transfer in the catalyst pellet and in the catalyst bed as a whole, low-cost along with high activity. As well as there is a need in a simple and safe preparation method of the catalyst.

SUMMARY OF THE INVENTION

In accordance with the present invention a catalyst for synthesis of hydrocarbons from CO and H$_2$ is provided. The catalyst comprises a metal selected from Group VIII of the Mendeleev's Periodic Table of the Elements as active component and a porous support with an oxide component wherein carbon nanotubes are grafted to the pore walls of the support.

In one preferred embodiment of the invention the active component is a metal selected from Co, Fe or Ru and the metal content is 10-45% by weight based on the total weight of the catalyst.

In one preferred embodiment of the invention the oxide component is selected from oxides of aluminium, silicon, titanium, zirconium, magnesium or lanthanum, zeolites, mixed oxides and/or mixtures thereof.

In one preferred embodiment of the invention the support pore size is at least 10 nm.

In one preferred embodiment of the invention the porous support content is 45-80% by weight based on the total weight of the catalyst.

In one preferred embodiment of the invention the carbon nanotube content is 10-35% by weight based on the total weight of the catalyst.

In one preferred embodiment of the invention the catalyst further comprises promoters, moreover the elements of II-IV and/or VI-VIII groups of the Mendeleev's Periodic Table of the Elements are used as the promoters and the promoter content is 0.1-5% by weight based on the total weight of the catalyst.

The present invention also relates to a method for preparing a catalyst for synthesis of hydrocarbons from CO and H$_2$ comprising a metal selected from the Group VIII of the Mendeleev's Periodic Table of the Elements as active component and a porous support with an oxide component, the method comprises: the active component is applied onto the oxide component by impregnation with an aqueous solution of the metal salt; followed by drying, calcinating and treatment in hydrogen stream to obtain the porous material, the carbon nanotubes are deposited and grafted by flowing carbon-containing gas through the porous material at 600-650° C., then the treatment with the solution of the salt of the active metal selected from a group consisting of Co, Fe or Ru is repeated until the metal content of 10-45% by weight based on the total weight of the catalyst has been achieved, followed by drying and calcinating.

In one preferred embodiment of the invention the active component is a metal selected from Co, Fe or Ru and the metal content is 10-45% by weight based on the total weight of the catalyst.

In one preferred embodiment of the invention the oxide component is selected from oxides of aluminium, silicon, titanium, zirconium, magnesium or lanthanum, zeolites, mixed oxides and/or mixtures thereof.

In one preferred embodiment of the invention the carbon nanotube content is 10-35% by weight based on the total weight of the catalyst.

In one preferred embodiment of the invention further the support is impregnated with a solution of a promoter salt, moreover metals of II-IV and/or VI-VIII groups of the Mendeleev's Periodic Table of the Elements and/or oxides are used as the promoters and the promoter content is 0.1-5% by weight based on the total weight of the catalyst.

DETAIL DESCRIPTION OF PREFERRED EMBODIMENTS

Numerous experimental studies of the inventors demonstrate that in contrast to the known use of the nanotubes (Chin Y. H. et.al., Preparation of a novel structured catalyst based on aligned carbon nanotube arrays for a microchannel Fischer-Tropsch synthesis reactor, *Catalysis Today*, v. 110, pp. 47-52, 2005) the procedures of the present method gives possibility to prepare an ordered arrangement of the nanotubes fixed on the walls of the transport pores of the catalyst pellets instead the compacted, oriented in one direction nanotube array with the active centers on the free ends of the nanotubes on the metalloceramic support. The active centers in the present catalyst are positioned close to the fixed end of the nanotubes that is effective for providing heat- and mass-transfer in the process of hydrocarbon production from CO and $H_2$. The claimed catalyst and the preparation method thereof make possible to form the catalytic bed for the process of hydrocarbon production from CO and $H_2$ in accordance with the current requirements, i.e. providing high concentration of a catalytically active component in the reaction volume; the small size of the catalyst particles less than 50 μm, high heat conductivity of the catalyst bed, the extended surface of the gas-liquid interphase and regimen of the gas convection current close to plug flow.

In accordance with the present invention a catalyst for synthesis of hydrocarbons from CO and $H_2$ is provided. The catalyst comprises a metal selected from the Group VIII of the Mendeleev's Periodic Table of the Elements as an active component and a porous support with an oxide component and carbon component. The carbon component is carbon nanotubes (CNT) which are grafted (fixed) into the pore walls of the support.

The graft of the carbon nanotubes onto the pore walls of the oxide component takes place during their growth (deposition) by CVD on the particles of the metal of the active component, selected from Group VIII of the Mendeleev's Periodic Table of the Elements, e.g., Co, Fe or Ru. The metal particles are loaded onto the porous oxide support in the process of the impregnation with a solution of the metal salt.

The oxide component of the support is a porous material consisting of oxides of aluminium, silicon, titanium, zirconium, magnesium or lanthanum, zeolites, mixed oxides and/or mixtures thereof, the porous material content is 45-80% by weight based on the total weight of the catalyst. The pores in the oxide component make possible to fix the carbon nanotubes on the metal particles in such way to graft the carbon nanotubes into the pore walls, moreover the pore size is at least 10 nm, these facts provide the efficient product evacuation from the active centers. The oxide component can have the different form, e.g. pellets, balls; their size may be changed from 1 to 5 mm.

The oxide component content less than 45% based on the total weight of the catalyst is undesirable because of the significant lowering in the catalyst selectivity of $C_5$ hydrocarbons; the component content more than 80% decreases considerably the catalyst activity in the hydrocarbon production.

The active component (Co, Fe or Ru) content is 10-45% by weight based on the total weight of the catalyst. The metal content less than 10% and more than 45% is unreasonable.

The carbon nanotube content is 10-35% by weight based on the total weight of the catalyst. The content less than 10% does not tale effect and more than 45% decreases the catalyst activity in the hydrocarbon production.

The catalyst further comprises promoters, moreover the elements of II-IV and/or VI-VIII groups of the Mendeleev's Periodic Table of the Elements are used as the promoters and the promoter content is 0.1-5% by weight based on the total weight of the catalyst. The promoters are introduced into the catalyst by impregnation with a solution of the metal salt.

The present invention also relates to a method for preparing the claimed catalyst for synthesis of hydrocarbons from CO and $H_2$ comprising: the active metal selected from the Group VIII of the Mendeleev's Periodic Table of the Elements, such as Co, Fe or Ru, is applied onto the oxide component by impregnation with an aqueous solution of the metal salt. Then the sample is dried, calcinated and treated in hydrogen stream to obtain the porous material. The carbon nanotubes in an amount of 10-35% by weight based on the total weight of the catalyst are grafted by CVD from the carbon-containing gas at 600-650° C. The porous material with grafted CNT is impregnated again with the solution of the salt of the active metal selected from a group consisting of Co, Fe or Ru until the metal content of 10-45% by weight based on the total weight of the catalyst has been achieved, followed by drying and calcinating.

The porous support with the CNT grafted into the pore walls is impregnated with a solution of a promoter salt. Metals of II-IV and/or VI-VIII groups of the Mendeleev's Periodic Table of the Elements and/or oxides are used as the promoters and the promoter content is 0.1-5% by weight based on the total weight of the catalyst.

It was established that use of the present catalyst in the hydrocarbon production enhanced the stability to overheating even at high load of synthesis gas. Simultaneously the main product productivity increases.

The carbon nanotubes are grafted into the pore walls of the support by the active metal particles during CVD and oriented towards the gas flow. These facts improve the catalyst properties, e.g. they provide an improved mass- and heat transfer.

The present catalyst, comprising CNT, may be used in the Fischer-Tropsch reaction, oxidation reaction CO, steam reforming, hydrogenation of alkenes (among them selective alkadienes and alkynes into olefins), n-butane dehydrogenation, and CO hydrogenation.

In accordance with the present method the formation of the catalyst containing CNT requires the previous preparation of the porous support. For this purpose the active metal selected from the Group VIII of the Mendeleev's Periodic Table of the Elements, such as Co, Fe or Ru, is introduced onto the oxide component by impregnation with an aqueous solution of the metal salt, followed by drying and calcinating and treatment in hydrogen stream at 500° C. during 2 hours. The carbon nanotubes in an amount of 10-35% by weight based on the total weight of the catalyst are deposited and grafted by CVD on the active metal particles in the pore walls of the oxide component.

The CVD is carried out with the carbon containing gas. Methane, acetylene, carbon monoxide doped with hydrogen and/or inert gases (argon, helium) is used as carbon containing gas. The porous material with the active metal particles is put in the vertical flow reactor and heated to the reaction temperature. The carbon-containing gas is continuously supplied into the reactor and the gas products are evacuated. The reactor is a quartz tube of 30 mm diameter and 400 mm length). The quartz tube is blown off with the inert gas for air discharge. The porous material is previously reduced. The synthesis is performed at a pressure 0.01-1 MPa and a temperature 500-1100° C. during 30-240 min. The porous material is allowed to cool down to room temperature and is discharged from the reactor.

The active metal is applied by impregnation with an aqueous solution of the salt (nitrate, acetate, formate, acetylacetonate etc.) of Co, Fe or Ru. Depending on the amount of the active metal the impregnation can be multistage, i.e. single-stage, two-stage etc. Each stage involves drying in water bath, followed by drying and/or calcinating in the inert gas flow at temperature of 100-1000° C. during 60-600 min. If necessary the procedure is repeated with promoters.

Before CNT deposition and graft into the pore walls of the porous system of the oxide component, the porous material is activated by reduction in the stream of hydrogen (gas hour space rate 1000-5000 l/h) at a temperature in the range from 500 to 800° C. during 60-180 min.

Before carrying out the synthesis of hydrocarbons, a sample of the catalyst is activated by reduction in the stream of hydrogen (gas hour space rate 1000-5000 l/h) at a temperature in the range from 300 to 600° C. during 60-300 min.

Synthesis of hydrocarbons from $CO:H_2$ is carried out in a tubular reactor with a fixed bed of the claimed catalyst under a pressure in the range from 0.1 to 4 MPa and a temperature in the range from 150 to 300° C. The molar ratio of $CO:H_2$ in synthesis gas is in the range from 1:1 to 1:3.

To further illustrate various illustrative embodiments of the present invention the following examples are provided.

EXAMPLES

Examples 1

A sample of catalyst comprising 10% Co/(80% $SiO_2$+10% CNT) is prepared as follows.
1. Preparation of Catalyst Support with CNT.
0.05 g Co from an aqueous solution of cobalt nitrate is applied on 1 g oxide component $SiO_2$ by wet impregnation, then dried and calcined. The obtained material is treated in hydrogen stream at temperature of 500° C. during 2 hours, placed in the reactor of 30 mm diameter, heated until temperature of 650° C. in hydrogen stream and then the methane-hydrogen mixture with ratio $CH_4:H_2$ as 2:1 and feed rate of 40:20 ml/min is introduced into the reactor. The deposited CNT are fixed on cobalt particles of the porous system walls of the support. Unreacted methane and hydrogen are taken away from the reactor through a trap. Synthesis time is 30 min. On completing the reactor is allowed to cool down to room temperature in a flow of hydrogen and the obtained material is discharged from the reactor. The material is the porous support containing the oxide component and carbon nanotubes of cone and cylinder structure with a diameter of 8-70 nm.
2. Preparation of the Sample of the Catalyst.
0.05 g Co from an aqueous solution of cobalt nitrate is applied on the support with the CNTs grafted in the pores, and then the sample is dried and calcined.

Prior to use in a Fischer-Tropsch reaction the catalyst sample is activated with hydrogen stream (gas hour space rate 3000 l/h) at 400° C. during 1 hour. Synthesis of hydrocarbons is carried out in a tubular reactor with a fixed bed of the catalyst at 2 MPa and 160-240° C., using the molar ratio of $CO:H_2$ in synthesis gas as 1:2 (gas hour space rate 3000 l/h).

Example 2

A sample of catalyst comprising 25% Co/(60% Zeolite HY+15% CNT) is prepared as follows.
1. Preparation of the Catalyst Support with CNT.
Cobalt is applied on 1 g oxide component Zeolite HY by wet impregnation, the material is treated, as described in EXAMPLE 1. The obtained material is placed in the reactor of 30 mm diameter, heated until temperature of 500° C. in argon stream and then the acetylene-argon mixture with ratio $C_2H_2:Ar$ as 1:7 and feed rate of 12:93 ml/min is introduced into the reactor. The deposited CNT are fixed on cobalt particles of the porous system walls of the support. Unreacted acetylene and argon are taken away from the reactor through a trap. Synthesis time is 120 min. On completing the reactor is allowed to cool down to room temperature in a flow of argon and the obtained material is discharged from the reactor. The material is the porous support containing the oxide component and carbon nanotubes of cone and cylinder structure with a diameter of 8-60 nm.
2. Preparation of the Sample of the Catalyst.
0.20 g Co from an aqueous solution of cobalt nitrate is applied on the support with the CNTs grafted in the pores, and then the sample is dried and calcined.

Prior to use in a Fischer-Tropsch reaction the catalyst sample is activated with hydrogen stream (gas hour space rate 3000 l/h) at 450° C. during 1 hour. Synthesis of hydrocarbons is carried out in a tubular reactor with a fixed bed of the catalyst at 2 MPa and 160-240° C., using the molar ratio of $CO:H_2$ in synthesis gas as 1:2 (gas hour space rate 3000 l/h).

Example 3

A sample of catalyst comprising 45% Co/(45% MgO+10% CNT) is prepared as follows.
1. Preparation of Catalyst Support with CNT.
Cobalt is applied on 1 g oxide component MgO by wet impregnation, the material is treated, as described in EXAMPLE 1. The obtained material is placed in the reactor of 30 mm diameter, heated until temperature of 650° C. in hydrogen stream and then the methane-hydrogen mixture with ratio $CH_4:H_2$ as 2:1 and feed rate of 80:40 ml/min is introduced into the reactor. The deposited CNT are fixed on cobalt particles of the porous system walls of the support. Unreacted methane and hydrogen are taken away from the reactor through a trap. Synthesis time is 180 min. On completing the reactor is allowed to cool down to room temperature in a flow of hydrogen and the obtained material is discharged from the reactor. The material is the porous support containing the oxide component and carbon nanotubes of cone and cylinder structure with a diameter of 8-50 nm.
2. Preparation of the Sample of the Catalyst.
0.40 g Co from an aqueous solution of cobalt nitrate is applied on the support with the CNTs grafted in the pores by impregnation, and then the sample is dried and calcined.

The activation of the catalyst and the synthesis of hydrocarbons are performed as described in EXAMPLE 1.

Example 4

A sample of catalyst comprising 25% Fe/(65% $La_2O_3$+ 10% CNT) is prepared as follows. 1. Preparation of Catalyst Support with CNT.
0.05 g Fe (III) is applied on 1 g oxide component $La_2O_3$ by wet impregnation, the material is treated, as described in EXAMPLE 1. The obtained material is placed in the reactor of 30 mm diameter, heated until temperature of 600° C. in nitrogen-hydrogen mixture stream, $N_2:H_2$ ratio=2:1 and then the mixture of acetylene, nitrogen and hydrogen with volume ratio $C_2H_2:N_2:H_2$ as 1:7:4 and feed rate of 12:93:45 ml/min is introduced into the reactor. The deposited CNT are fixed on cobalt particles of the porous system walls of the support. Unreacted acetylene, nitrogen and hydrogen are taken away from the reactor through a trap. Synthesis time is 180 min. On completing the reactor is allowed to cool down to room temperature in a flow of hydrogen and the obtained material is discharged from the reactor. The material is the porous support containing the oxide component and carbon nanotubes of cone and cylinder structure with a diameter of 8-60 nm.

2. Preparation of the Sample of the Catalyst.

0.20 g Fe from an aqueous solution of ferric nitrate is applied on the support with the CNTs grafted in the pores by impregnation, and then the sample is dried and calcined.

The activation of the catalyst and the synthesis of hydrocarbons are performed as described in EXAMPLE 1.

Example 5

A sample of catalyst comprising 10% Ni/(70% $TiO_2$+20% CNT) is prepared as follows.
1. Preparation of Catalyst Support with CNT.

0.05 g Ni from an aqueous solution of nickel nitrate is applied on 1 g oxide component $TiO_2$ by wet impregnation, the material is treated, as described in EXAMPLE 1. The obtained material is placed in the reactor of 30 mm diameter, heated until temperature of 700° C. in hydrogen stream and then the mixture of acetylene, nitrogen and hydrogen with volume ratio $C_2H_2$:$N_2$:$H_2$ as 1:7:4 and feed rate of 12:93:45 ml/min is introduced into the reactor. The deposited CNT are fixed on cobalt particles of the porous system walls of the support. Unreacted acetylene, nitrogen and hydrogen are taken away from the reactor through a trap. Synthesis time is 120 min. On completing the reactor is allowed to cool down to room temperature in a flow of hydrogen and the obtained material is discharged from the reactor. The material is the porous support containing the oxide component and carbon nanotubes of cone and cylinder structure with a diameter of 5-10 nm.
2. Preparation of the Sample of the Catalyst.

0.05 g Ni from an aqueous solution of nickel nitrate is applied on the support with the CNTs grafted in the pores by impregnation, and then the sample is dried and calcined.

The activation of the catalyst and the synthesis of hydrocarbons are performed as described in EXAMPLE 1.

Example 6

A sample of catalyst comprising 20% Ru/(70% $Al_2O_3$+10% CNT) is prepared as follows. 1. Preparation of Catalyst Support with CNT.

0.05 g Ru is applied on 1 g oxide component $Al_2O_3$ by wet impregnation, the material is treated, as described in EXAMPLE 1. The obtained material is placed in the reactor of 30 mm diameter, heated until temperature of 650° C. in hydrogen stream and then the methane-hydrogen mixture with ratio $CH_4$:$H_2$ as 2:1 and feed rate of 110:55 ml/min is introduced into the reactor. The deposited CNT are fixed on cobalt particles of the porous system walls of the support. Unreacted methane and hydrogen are taken away from the reactor through a trap. Synthesis time is 120 min. On completing the reactor is allowed to cool down to room temperature in a flow of hydrogen and the obtained material is discharged from the reactor. The material is the porous support containing the oxide component and carbon nanotubes of cone and cylinder structure with a diameter of 8-70 nm.
2. Preparation of the Sample of the Catalyst.

0.15 g Ru from an aqueous solution of ruthenium nitrate is applied on the support with the CNTs grafted in the pores by impregnation, and then the sample is dried and calcined.

The activation of the catalyst and the synthesis of hydrocarbons are performed as described in EXAMPLE 1.

Example 7

A sample of catalyst comprising 40% Co/(50% $ZrO_2$+10% CNT) is prepared as follows. 1. Preparation of Catalyst Support with CNT.

0.05 g Co is applied on 1 g oxide component $ZrO_2$ by wet impregnation, the material is treated, as described in EXAMPLE 1. The obtained material is placed in the reactor of 30 mm diameter, heated until temperature of 650° C. in hydrogen stream and then the methane-hydrogen mixture with ratio $CH_4$:$H_2$ as 2:1 and feed rate of 80:40 ml/min is introduced into the reactor. The deposited CNT are fixed on cobalt particles of the porous system walls of the support. Unreacted methane and hydrogen are taken away from the reactor through a trap. Synthesis time is 120 min. On completing the reactor is allowed to cool down to room temperature in a flow of hydrogen and the obtained material is discharged from the reactor. The material is the porous support containing the oxide component and carbon nanotubes of cone and cylinder structure with a diameter of 8-60 nm.
2. Preparation of the Sample of the Catalyst.

0.35 g Co from an aqueous solution of cobalt nitrate is applied on the support with the CNTs grafted in the pores by impregnation, and then the sample is dried and calcined.

The activation of the catalyst and the synthesis of hydrocarbons are performed as described in EXAMPLE 1.

Example 8

A sample of catalyst comprising 25% Co-3% Ba/(57% Zeolite HY+15% CNT) is prepared as follows.
1. Preparation of Catalyst Support with CNT.

The porous support with the oxide component and carbon nanotubes is prepared as described in EXAMPLE 2. The carbon nanotubes have the cone and cylinder structure with a diameter of 10-80 nm.
2. Preparation of the Sample of the Catalyst.

0.03 g Ba and 0.2 g Co from the aqueous solutions of the appropriate salts are applied on the support with the CNTs grafted in the pores by impregnation, and then the sample is dried and calcined.

The activation of the catalyst and the synthesis of hydrocarbons are performed as described in EXAMPLE 1.

Example 9

A sample of catalyst comprising 25% Co-1.5% Al/(63.5% Zeolite HY+10% CNT) is prepared as follows.
1. Preparation of Catalyst Support with CNT.

The porous support with the oxide component and carbon nanotubes is prepared as described in EXAMPLE 2. The carbon nanotubes have the cone and cylinder structure with a diameter of 8-70 nm.
2. Preparation of the Sample of the Catalyst.

0.015 g Al and 0.2 g Co from the aqueous solutions of the appropriate salts are applied on the support with the CNTs grafted in the pores by impregnation, and then the sample is dried and calcined.

The activation of the catalyst and the synthesis of hydrocarbons are performed as described in EXAMPLE 1.

Example 10

A sample of catalyst comprising 25% Co-3% Zr/(54% Zeolite HY+18% CNT) is prepared as follows.
1. Preparation of Catalyst Support with CNT.

The porous support with the oxide component and carbon nanotubes is prepared as described in EXAMPLE 2. The carbon nanotubes have the cone and cylinder structure with a diameter of 8-90 nm.

2. Preparation of the Sample of the Catalyst.

0.03 g Zr and 0.2 g Co from the aqueous solutions of the appropriate salts are applied on the support with the CNTs grafted in the pores by impregnation, and then the sample is dried and calcined.

The activation of the catalyst and the synthesis of hydrocarbons are performed as described in EXAMPLE 1.

Example 11

A sample of catalyst comprising 25% Co-5% Cr/(53% Zeolite HY+17% CNT) is prepared as follows.

1. Preparation of Catalyst Support with CNT.

The porous support with the oxide component and carbon nanotubes is prepared as described in EXAMPLE 2. The carbon nanotubes have the cone and cylinder structure with a diameter of 10-80 nm.

2. Preparation of the Sample of the Catalyst.

0.03 g Cr and 0.2 g Co from the aqueous solutions of the appropriate salts are applied on the support with the CNTs grafted in the pores by impregnation, and then the sample is dried and calcined.

The activation of the catalyst and the synthesis of hydrocarbons are performed as described in EXAMPLE 1.

Example 12

A sample of catalyst comprising 25% Co-0.1% Re/(55.9% Zeolite HY+19% CNT) is prepared as follows.

1. Preparation of Catalyst Support with CNT.

The porous support with the oxide component and carbon nanotubes is prepared as described in EXAMPLE 2. The carbon nanotubes have the cone and cylinder structure with a diameter of 8-60 nm.

2. Preparation of the Sample of the Catalyst.

0.001 g Re and 0.2 g Co from the aqueous solutions of the appropriate salts are applied on the support with the CNTs grafted in the pores by impregnation, and then the sample is dried and calcined.

The activation of the catalyst and the synthesis of hydrocarbons are performed as described in EXAMPLE 1.

Example 13

A sample of catalyst comprising 25% Co-0.5% Fe/(59.5% Zeolite HY+15% CNT) is prepared as follows.

1. Preparation of Catalyst Support with CNT.

The porous support with the oxide component and carbon nanotubes is prepared as described in EXAMPLE 2. The carbon nanotubes have the cone and cylinder structure with a diameter of 8-70 nm.

2. Preparation of the Sample of the Catalyst.

0.005 g Fe and 0.2 g Co from the aqueous solutions of the appropriate salts are applied on the support with the CNTs grafted in the pores by impregnation, and then the sample is dried and calcined.

The activation of the catalyst and the synthesis of hydrocarbons are performed as described in EXAMPLE 1.

Example 14

Comparison with the Known Catalyst of the Fischer-Tropsch Process 20% Co/(80% Zeolite)

A sample of catalyst comprising 20% Co/(80% Zeolite) is prepared as follows. 1. Preparation of Catalyst Support The granular zeolite HB is used as support. 2. Preparation of the Sample of the Catalyst.

Cobalt is applied as described in EXAMPLE 1.

The activation of the catalyst and the synthesis of hydrocarbons are performed as described in EXAMPLE 1.

Example 15

Comparison with the Known Catalyst of the Fischer-Tropsch Process 20% Co/CNT according to EP1782885

A sample of catalyst comprising 20% Co/CNT is prepared as follows.

1. Preparation of Catalyst Support

The carbon nanotubes are grown by CVD from ethylene according to the method disclosed by Chin Y. H. et.al., in *Catalysis Today*, v. 110, pp. 47-52, 2005. The support is a flaky black powder with the bulk density of 0.4 g/cm$^3$.

2. Preparation of the Sample of the Catalyst.

Cobalt is applied as described in EXAMPLE 1.

The activation of the catalyst and the synthesis of hydrocarbons are performed as described in EXAMPLE 1.

The results of the synthesis of hydrocarbons from CO and $H_2$ with samples of the catalysts of the composition according to Examples 1-15 are shown in the TABLE 1 below.

The results shown in Table 1 demonstrate that if compare the catalyst according to the present invention containing the carbon nanotubes grafted to pore walls of the support and the catalyst of Example 14 without the carbon nanotubes, then CO conversion and the productivity for $C_5$ and higher hydrocarbons increases and $CH_4$ selectivity drops. The catalyst of Example 15 has low activity when the synthesis gas hour space rate is 3000 l/h.

Therefore the catalyst for synthesis of hydrocarbons according to the present invention is an effective, selective catalyst of new type, such catalyst is stable to overheating, reliable, with improved heat- and mass-transfer in the catalyst pellet and in the catalyst bed as a whole, low-cost along with high activity. The preparation method of the catalyst is simple and safe.

TABLE 1

| Example | CO conversion, % | CH$_4$ selectivity, % | Productivity for C$_5$ and higher, kg/(m$^3$ · h) |
|---|---|---|---|
| 1 | 77 | 20 | 298 |
| 2 | 70 | 21 | 293 |
| 3 | 74 | 18 | 323 |
| 4 | 75 | 20 | 315 |
| 5 | 73 | 19 | 318 |
| 6 | 69 | 21 | 302 |
| 7 | 72 | 21 | 317 |
| 8 | 79 | 22 | 330 |
| 9 | 75 | 18 | 327 |
| 10 | 77 | 18 | 332 |
| 11 | 75 | 19 | 327 |
| 12 | 82 | 21 | 333 |
| 13 | 76 | 18 | 324 |
| 14 | 60 | 35 | 206 |
| 15 | 27 | 40 | 87 |

The invention claimed is:

1. A catalyst for synthesis of hydrocarbons from CO and $H_2$ comprising:
   a metal from Group VIII of the Mendeleev's Periodic Table of the Elements as an active component,
   a porous support with an oxide component, and
   carbon nanotubes grafted into pore walls of the support,
   wherein the metal content is 10-45% by weight based on the total weight of the catalyst and wherein the carbon nanotube content is 10-35% by weight based on the total weight of the catalyst.

2. The catalyst according to claim 1, wherein the active component is a metal selected from the group consisting of Co, Fe and Ru.

3. The catalyst according to claim 1, wherein the oxide component is selected from the group consisting of oxides of aluminium, silicon, titanium, zirconium, magnesium, lanthanum, zeolites, mixed oxides and mixtures thereof.

4. The catalyst according to claim 1, wherein the support pore size is at least 10 nm.

5. The catalyst according to claim 1, wherein the porous support content is 45-80% by weight based on the total weight of the catalyst.

6. The catalyst according to claim 1, wherein the catalyst further comprises promoters that are elements of Groups II-IV and/or VI-VIII of the Mendeleev's Periodic Table of the Elements, wherein the promoter content is 0.1-5% by weight based on the total weight of the catalyst.

7. A method for preparing a catalyst for synthesis of hydrocarbons from CO and $H_2$ comprising a metal from Group VIII of the Mendeleev's Periodic Table of the Elements as active component and a porous support with an oxide component, wherein the method comprises:
   applying the active component onto the oxide component of the porous support by impregnation with an aqueous solution of the metal salt,
   drying,
   calcinating,
   treating in a hydrogen stream to obtain a porous material, wherein the carbon nanotubes are deposited and grafted into pore walls of the porous support by flowing carbon-containing gas through the porous material at 600-650° C., wherein the carbon nanotube content is 10-35% by weight based on the total weight of the catalyst,
   treating repeatedly with a solution of a salt of a metal selected from the group consisting of Co, Fe and Ru until a metal content of 10-45% by weight based on the total weight of the catalyst has been achieved,
   drying, and
   calcinating.

8. The method according to claim 7 wherein the active component is a metal selected from the group consisting of Co, Fe and RU.

9. The method according to claim 7, wherein the oxide component is selected from the group consisting of oxides of aluminium, silicon, titanium, zirconium, magnesium, lanthanum, zeolites, mixed oxides and mixtures thereof.

10. The method according to claim 7, further comprising impregnating the support with a solution of a salt of a promoter that is a metal of Group III-IV and/or VI-VIII of the Mendeleev's Periodic Table of the Elements and/or an oxide thereof, wherein the promoter content is 0.1-5% by weight based on the total weight of the catalyst.

* * * * *

UNITED STATES PATENT AND TRADEMARK OFFICE
CERTIFICATE OF CORRECTION

PATENT NO. : 8,865,613 B2
APPLICATION NO. : 13/504929
DATED : October 21, 2014
INVENTOR(S) : Vladimir Zalmanovich Mordkovich Page 1 of 1

It is certified that error appears in the above-identified patent and that said Letters Patent is hereby corrected as shown below:

On the Title Page, References Cited
  In column 2 (page 1, item 56) at line 20, under Other Publications, change "Macrocylic Hemistry." to --Macrocyclic Chemistry.--.

In the Specification
  In column 2 at line 14 (approx.), change "disalignment" to --misalignment--.
  In column 2 at line 19, please change "1/h" to --$h^{-1}$--.
  In column 2 at line 46, change "desintegration." to --disintegration.--.
  In column 4 at line 37, please change "1/h" to --$h^{-1}$--.
  In column 7 at line 58, change "tale" to --take--.
  In column 8 at lines 61-62, change "acetylactonate" to --acetylacetonate--.
  In column 9 at line 4, please change "1/h" to --$h^{-1}$--.
  In column 9 at line 8, please change "1/h" to --$h^{-1}$--.
  In column 9 at line 48, please change "1/h" to --$h^{-1}$--.
  In column 9 at line 51, please change "1/h" to --$h^{-1}$--.
  In column 10 at line 13 (approx.), please change "1/h" to --$h^{-1}$--.
  In column 10 at line 16 (approx.), please change "1/h" to --$h^{-1}$--.
  In column 14 at line 40, please change "1/h" to --$h^{-1}$--.

In the Claims
  In column 16 at line 28 (approx.), in Claim 10, change "III-IV" to --II-IV--.

Signed and Sealed this
Twelfth Day of May, 2015

Michelle K. Lee
*Director of the United States Patent and Trademark Office*